(12) United States Patent
Kolev et al.

(10) Patent No.: US 11,343,195 B1
(45) Date of Patent: May 24, 2022

(54) EPHEMERAL DATA STREAM ROUTING SERVICE

(71) Applicant: Amazon Technologies, Inc., Seattle, WA (US)

(72) Inventors: Georgi Petev Kolev, Cambridge (GB); Didier Wenzek, Cambridge (GB); Carl Summers, Cambridge (GB); Gabriel Theodoro, Cambridge (GB); Mikhail Erofeev, Cambridge (GB); Adam Bene, Cambridge (GB)

(73) Assignee: .Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/118,215

(22) Filed: Dec. 10, 2020

(51) Int. Cl.
*H04L 12/841* (2013.01)
*H04L 47/28* (2022.01)
*H04L 47/215* (2022.01)
*H04L 45/30* (2022.01)

(52) U.S. Cl.
CPC ........ *H04L 47/286* (2013.01); *H04L 45/3065* (2013.01); *H04L 47/215* (2013.01)

(58) Field of Classification Search
CPC .. H04L 47/286; H04L 45/3065; H04L 47/215
See application file for complete search history.

(56) References Cited

U.S. PATENT DOCUMENTS

| 11,146,569 | B1 * | 10/2021 | Brooker | G06F 21/335 |
| 2012/0331144 | A1 * | 12/2012 | Supalov | G06F 9/5072 |
| | | | | 709/226 |
| 2015/0120928 | A1 * | 4/2015 | Gummaraju | H04L 67/1008 |
| | | | | 709/226 |
| 2015/0248553 | A1 | 9/2015 | Strand et al. | |
| 2016/0142323 | A1 * | 5/2016 | Lehmann | H04L 41/5025 |
| | | | | 709/226 |
| 2016/0197706 | A1 | 7/2016 | Lester et al. | |
| 2019/0075157 | A1 * | 3/2019 | Reber | G06Q 20/22 |
| 2020/0175387 | A1 * | 6/2020 | Braz | G06N 20/00 |
| 2020/0186445 | A1 * | 6/2020 | Govindaraju | H04L 67/10 |
| 2020/0220937 | A1 | 7/2020 | Jain et al. | |
| 2020/0389403 | A1 * | 12/2020 | Buddhikot | H04L 47/125 |
| 2020/0404573 | A1 | 12/2020 | Narasimhaprasad et al. | |
| 2021/0029142 | A1 * | 1/2021 | Rajasekaran | G06N 20/00 |
| 2021/0266303 | A1 | 8/2021 | Pollutro et al. | |

\* cited by examiner

*Primary Examiner* — Chi H Pham
*Assistant Examiner* — Weibin Huang
(74) *Attorney, Agent, or Firm* — Knobbe Martens Olson & Bear LLP

(57) ABSTRACT

Systems and methods are described for streaming data between a user device and a remote computing environment via a "switchboard" service that enables interaction without the user device or the remote computing environment establishing additional connections. A first routing device receives a connection from a user device that requests routing a data stream to or from a remote computing environment. The first routing device processes the request by generating a token, which is passed to the remote computing environment along with the request. The remote computing environment passes the token to a second routing device, which decodes the routing token to identify the first routing device. The second routing device then passes the request token to the first routing device, which responds by establishing a route for streaming data between the connection made with the user device and the remote computing environment via the routing devices.

20 Claims, 13 Drawing Sheets

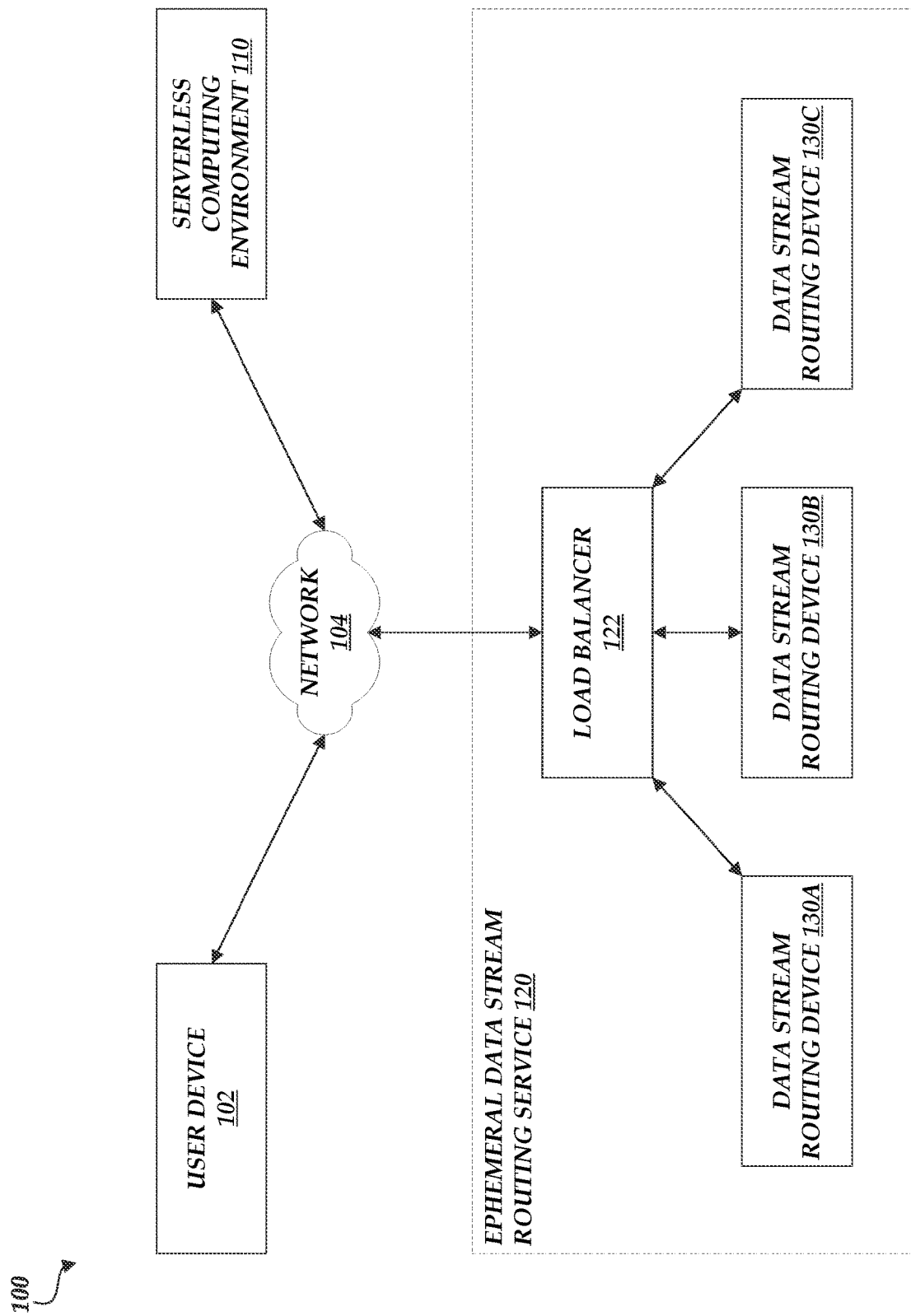

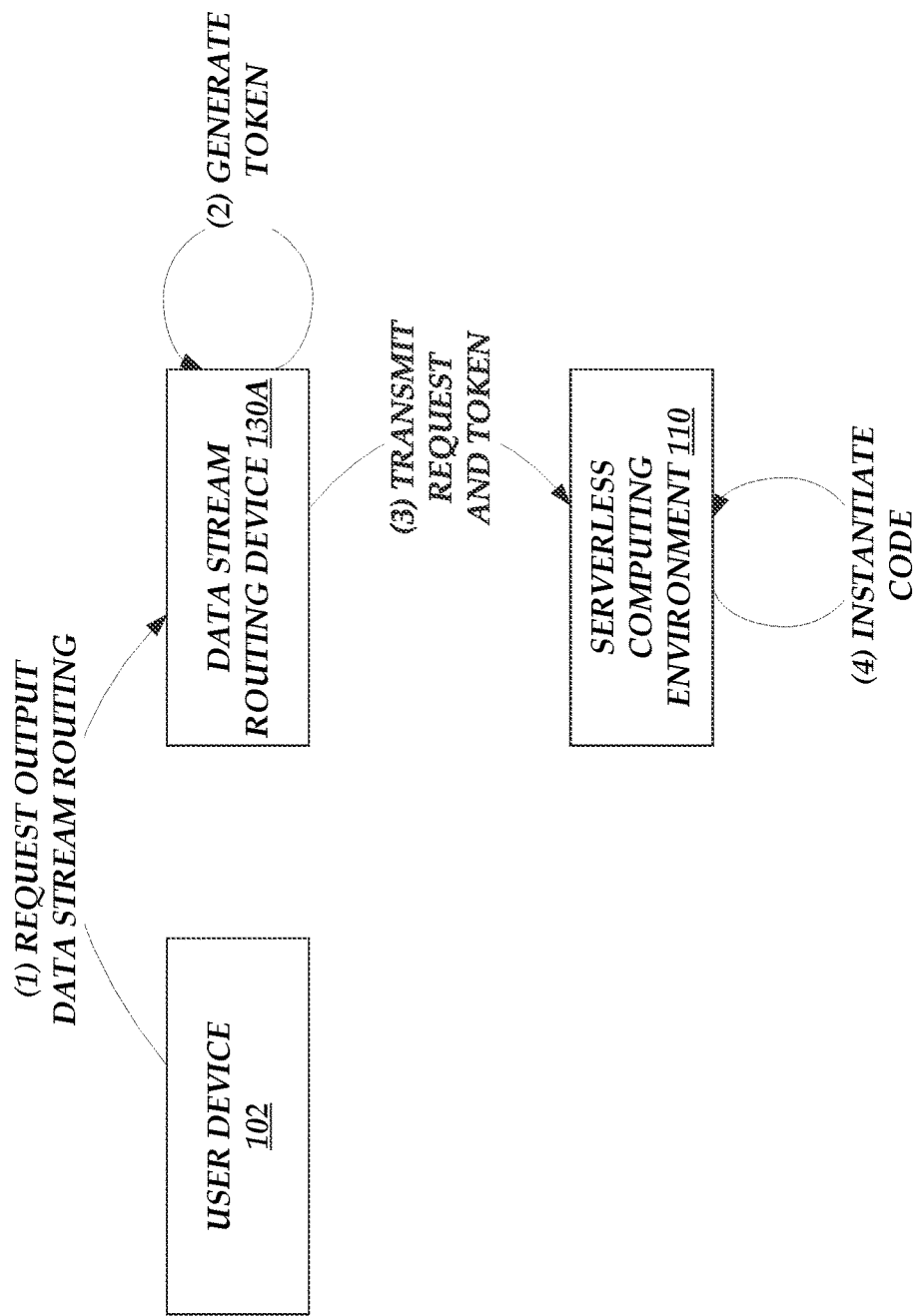

EPHEMERAL DATA STREAM ROUTING SERVICE

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

In some scenarios, a user can request that a data center provide computing resources. The computing resources may correspond to, e.g., storage devices, resources that perform a particular computing function such as data encryption or processing, or resources that execute a particular set of computer-executable instructions on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 1 is a block diagram depicting an example environment in which user devices and serverless computing environments can transmit and receive data streams via an ephemeral data stream routing service in accordance with aspects of the present disclosure.

FIGS. 2A and 2B are flow diagrams depicting example interactions for transmitting a data stream from a user device to a serverless computing environment via an ephemeral data stream routing service in accordance with aspects of the present disclosure.

DETAILED DESCRIPTION

Figure 2B:
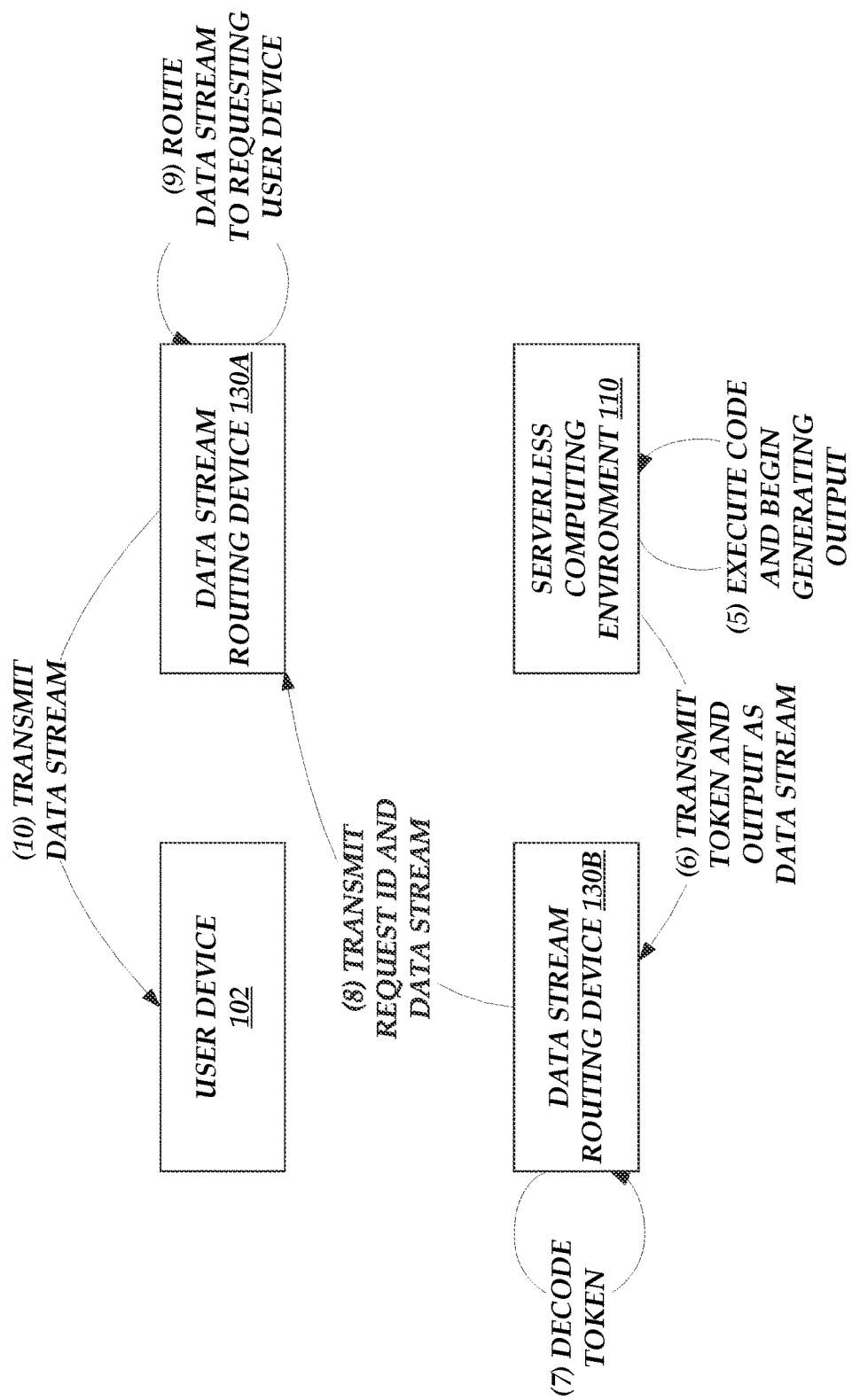

Generally described, aspects of the present disclosure relate to facilitating network data streams between two devices in a manner that does not require the two devices to directly connect to one another. Typically, a data stream connection is created by a first device initiating a connection to a second device, such as by using a uniform resource locator (URL) of the second device. However, in some cases it may be desirable for a first device to connect to a second device that limits user access, such as by placing limits on an initial connection to the second device or by placing the second device behind a firewall. In other instances, it may be desirable for a first device to connect to multiple devices via a single network connection. For example, it may be desirable that a client device connect to a first device to submit data, which is in turn passed to a second device for processing before a response is provided to the first device by the second device. In a traditional point-to-point connection schema, this "triangular" connection model is not possible. Embodiments of the present disclosure address these issues by providing a data stream routing service that can join a network connection from a first device to one or more network connections to other devices, such that the first device can communicate with the other devices without directly connecting to those devices, and such that the particular device to which the first device connects is not fixed but may be changed by the data stream routing service without breaking the first connection.

In one embodiment, the data stream routing service disclosed herein enables sending or receiving arbitrary amounts of data when interacting with a computing environment that limits the amount of data a user can directly upload or download via an initial network connection, or that does not allow a user to upload or download directly. An example of such a computing environment is an on-demand code execution system, which in some instances may be referred to as a "serverless" computing system. An on-demand code execution system may provide a network-accessible service enabling users to submit or designate computer-executable code to be executed by virtual machine instances on the on-demand code execution system. Each set of code on the on-demand code execution system may define a "task," and may implement specific functionality corresponding to that task when executed on a virtual machine instance of the on-demand code execution system. Because each task implements a given functionality, tasks may in some instances be also referred to as "functions." Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds), thus enabling execution of tasks in "real-time" (e.g., with little or no perceptible delay to an end user).

The on-demand code execution system may thus allow users to execute code in a serverless environment (e.g., one in which the underlying server is not under user control). The term "serverless environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

Because an on-demand code execution system abstracts away responsibility for managing and configuring the underlying execution environment, a user may be unable to access components of this execution environment directly. For example, the user may be unable to transmit input data directly to a task execution, because the user may not know how to access (or may not have permission to access) the physical or virtual computing device that executes the task. Similarly, it may not be possible for a task execution to return response data to a user via the same network connection used to request the task execution, since that connection may be made by a calling device to a "frontend" or similar gateway of the on-demand code execution system, rather than to a resulting task execution. In some aspects, this frontend or gateway may provide for transmission of a limited amount of data between a client and task execution as part of a request to execute a task. For example, the on-demand code execution system may provide an API for requesting task execution, and the user may be able to include some amount of data (e.g., as a payload of the request) when making the API call. The API may similarly allow the task to output a limited amount of data when reporting task completion. However, these techniques will typically allow only a limited quantity of information to be exchanged.

To overcome these limitations, a user may adopt alternative data transmission approaches. For example, a user may also configure a task to read from a storage device or write to a storage device in order to allow the task to process or output arbitrary amounts of data. However, this technique requires the user to upload the input data to a temporary location and then remove it once the task is completed, and typically requires that the user upload all of the data before the task can begin executing. Similarly, when downloading output data that a task has written to a storage device, the user may be required to wait for the task to finish executing before accessing the data, and must remove the output afterwards. The user may also incur costs associated with storing the data in a temporary location, or may encounter other issues (e.g., security, privacy, etc.) that make it undesirable to store the data online even temporarily. Furthermore, these alternative techniques do not conform to many standardized practices, which often expect to transmit and receive data over the same network connection used to initiate data transfer. For example, an HTTP "GET" request may use a network connection to request a data object via a network, and expect that object to be returned via the same network connection. Similarly, an HTTP "PUT" request may use a network connection to request to store a data object, and provide that data object via the network connection. The use of an alternative storage location generally does not allow for use of these standardized practices.

To address these problems, an ephemeral data stream routing service may be used as described herein as a connection "switchboard" that enables sending or receiving data to one or more remote computing environments over the same network connection used to initiate communication. The ephemeral data stream routine service thus allows users to combine data transfer and data processing into a single request rather than performing and managing these operations separately. The ephemeral data stream routing service further enables sending or receiving arbitrary amounts of data when interacting with remote computing environments that limit direct access to computing resources. As described in more detail herein, an ephemeral data stream routing service may establish single-use data stream connections between a user device and a remote computing environment, allowing the user to transmit or receive a data stream containing arbitrary amounts of data in conjunction with a request for computing services. The ephemeral data stream routing service may further allow a task executing in a remote computing environment to begin processing its input data before all of the data has been received, or may allow a user to begin receiving output from a remotely executing task before all of the output has been generated. The ephemeral data stream routing service may thus allow a remote computing environment to perform tasks more efficiently, by removing the need to perform data transfer as a separate activity from remote data processing, and may further allow some remote computing environments to perform tasks they would otherwise be unable to perform efficiently due to limitations on direct access to remote computing resources.

Although example embodiments herein describe the use of an ephemeral data stream routing service with a serverless computing environment, it will be understood that the ephemeral data stream routing service may be used with any computing environment and that the present disclosure is not limited to a particular computing environment. For example, the ephemeral data stream routing service may be used to "daisy-chain" remote computing environments to provide enhanced functionality. In an illustrative embodiment, the ephemeral data stream routing service may be used to encrypt and store data by sending a data stream to the ephemeral data stream routing service, which routes the data stream to a virtual appliance that provides encryption services and then routes the output of the virtual appliance to a networked data storage service. As a further example, the ephemeral data stream routing service may be used to route data streams to and from computing devices that are behind a firewall, network address translation ("NAT") service, or another platform that limits direct communication.

As will be appreciated by one of skill in the art in light of the present disclosure, the embodiments disclosed herein improve the ability of computing systems, such as serverless computing systems, to execute code in an efficient manner. Moreover, the presently disclosed embodiments address technical problems inherent within computing systems; specifically, the problems of communicating with and inputting or outputting data of arbitrary size in a remote computing environment that limits direct access to computing resources. These technical problems are addressed by the various technical solutions described herein, including the implementation of an ephemeral data stream routing service to facilitate communicating and/or processing of arbitrary amounts of data. Thus, the present disclosure represents an improvement on existing data processing systems and computing systems in general.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1 is a block diagram of an example environment 100 in which a user device 102 and a serverless computing environment 110 may communicate with an ephemeral data stream routing service 120. In the example environment 100, the user device 102, serverless computing environment 110, and ephemeral data stream routing service 120 communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The user device 102 may generally be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless computing environment 110 may provide the user device 102 with one or more user interfaces, command-line interfaces (CLIs), application programing interfaces (APIs), and/or other programmatic interfaces for generating and uploading user-provided code (including metadata identifying dependency code objects for the uploaded code), invoking the user-provided code (e.g., submitting a request to execute the user code in the serverless computing environment 110), scheduling event-based jobs or timed jobs, tracking the user-provided code, and/or viewing other logging or monitoring information related to their requests and/or user code. Although one or more embodiments may be described herein as using a user interface, it should be appreciated that such embodiments may, additionally or alternatively, use any CLIs, APIs, or other programmatic interfaces.

The serverless computing environment 110 may generally be any computing environment that executes user-submitted code and that limits access to at least some aspects of the environment in which the code is executed (e.g., by abstracting away the underlying physical or virtual computing device such that the user cannot access this device directly). In various embodiments, the serverless computing environment 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment." In some embodiments, the ephemeral data stream routing service 120 may be used to establish a data stream to or from a server-based computing environment rather than the serverless computing environment 110 depicted in FIG. 1.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution in the serverless computing environment 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., a storage system internal or external to the serverless computing environment 110) prior to the request being received by the serverless computing environment 110. As noted above, the code for a task may reference additional code objects maintained at the serverless computing environment 110 by use of identifiers of those code objects, such that the code objects are combined with the code of a task in an execution environment prior to execution of the task. The serverless computing environment 110 may vary its execution strategy for a task based on where the code of the task is available at the time a call for the task is processed. A request interface of the serverless computing environment 110 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

The example environment 100 further includes an ephemeral data stream routing service 120. As depicted, the ephemeral data stream routing service 120 includes a load balancer 122, which distributes incoming requests to establish ephemeral data streams to data stream routing devices 130A, 130B, and 130C, which are described in more detail with reference to FIG. 6 below and may implement aspects of the present disclosure as described in more detail below.

It will be understood that the environment 100 may include more (or fewer) elements, including more (or fewer) data stream routing devices 130A-C, than those shown in FIG. 1. It is not necessary, however, that all of these elements be shown in order to provide an enabling disclosure.

FIGS. 2A and 2B depict illustrative interactions for establishing an output data stream (i.e., a data stream from a task executing in a serverless computing environment 110 to the user device 102 that requested task execution) via an ephemeral data stream routing service in accordance with aspects of the present disclosure. At (1), the user device 102 establishes a network connection to the data stream routing device 130A and sends a data stream routing request. Illustratively, the data stream routing request may be an HTTP GET request, and may include information that identifies a source from which to route the data stream. For example, the request may specify that a remote computing environment (e.g., the serverless computing environment 110) should execute a task that provides output in the form of streaming data, and that the output should be routed to the user device 102 as a response to the GET request over the established connection. In various embodiments, the request may specify the task to execute by including the executable code associated with the task, including an identifier associated with the executable code, or providing other information that identifies the task.

At (2), the data stream routing device 130A generates a token that identifies the request and/or the network connection over which the request was transmitted. Illustratively, the data stream routing device 130A may generate a token that uniquely identifies the request based on characteristics of the request (e.g., the time at which it arrived, the user device 102 from which it was received, the connection made by the user device 102, a user account associated with the request or the task, etc.). In some instances, the token may be generated at least partly randomly, such as by including in the token a random value that is associated at the device 130A with the request. In some embodiments, the data stream routing device 130A may generate a token by obtaining a unique identifier from an external source and incorporating it into a token. In some embodiments, the token may further uniquely identify the data stream routing device 130A (as distinguished from other data stream routing devices, such as the data stream routing devices 130B and 130C). The token may thus be used by other data stream routing devices to identify the data stream routing device 130A from which the user device 102 expects to receive the streaming data, thereby enabling delivery of the streaming data over the existing connection between the user device 102 and the data stream routing device 130A. This in turn enables any data stream routing device to receive the token from the originator of the data stream and route the stream to the data stream routing device 130A, and enables configurations in which, e.g., a pool of data stream routing devices are managed by a load balancer. In some embodiments, the source of the data stream may pass both the data stream and the token to another computing device or service, which may perform various modifications to the data stream (e.g., encrypting, decrypting, adding or removing content, etc.) and then pass the modified data stream and the token to a data stream routing device, or in further embodiments may pass the modified data stream and the token to yet another computing device or service for further processing. The token may thus be used to route the data stream through a series of computing devices or services before being delivered to a data stream routing device, which then uses the token as described below to deliver the data stream to the user device 102 via the connection made at (1).

At (3), the data stream routing device 130A transmits the request to execute a task and the generated token to the serverless computing environment 110. In some embodiments, the serverless computing environment 110 that should receive the request may be specified in the request. In other embodiments, the data stream routing device 130A may identify the serverless computing environment 110, based on factors such as, e.g., an attribute of the request (e.g., the URL, the task, etc.) or an attribute of the serverless computing environment 110 (e.g., latency, workload, etc.). In further embodiments, the data stream routing device 130A may obtain configuration data, user preference data, or other criteria indicating that, e.g., certain types of requests should be sent to the serverless computing environment 110 for execution, requests from the user device 102 should be sent to the serverless computing environment 110, or the like.

In some embodiments, the data stream routing device 130A may modify the original user request to include the token, and then forward the modified request to the serverless computing environment 110. In other embodiments, the data stream routing device 130A may transmit the request and the token separately. In further embodiments, the data stream routing device 130A may generate a request based on the token and the original request received from the user device, and may transmit the request it generates rather than forwarding the request as originally received. For example, the format in which the user device 102 transmits the request may differ from the request format expected by the serverless computing environment 110. In some embodiments, the data stream routing device 130A may support routing of data streams for a variety of different computing environments, and may handle generation or conversion of user requests into various formats expected by the computing environments. For example, the data stream routing device 130A may receive a request for a data stream that is modified in a particular way (e.g., encrypted, decrypted, filtered, converted to a particular media format, enhanced with metadata, stripped of metadata, etc.), identify a computing environment that is configured to perform the requested modification, and convert the request to a format expected by that computing environment. As a further example, the data stream routing device 130A may identify a source of the unmodified data stream, and then generate one or more requests to cause the source to transmit the data stream (and, in some embodiments, the token) to a computing environment that performs the requested modification, and then causes the latter computing environment to transmit the modified data stream and the token to a data stream routing device.

At (4), the serverless computing environment 110 instantiates executable code corresponding to the requested task in a suitable computing environment. In various embodiments, the serverless computing environment 110 may provision a physical or virtual computing device, a container within a physical or virtual computing device, or other environment suitable for executing the code.

With reference now to FIG. 2B, at (5), the serverless computing environment 110 executes the code corresponding to the task and begins generating output. At (6), the task executing transmits the token and begins transmitting the output to a data stream routing device 130B. Illustratively, the data stream routing devices 130A and 130B may be members of a pool of devices that are assigned workloads by a load balancer (e.g., the load balancer 122 depicted in FIG. 1). As such, the task may not have control over which device is assigned when it requests to establish a data stream to the user device 102, and thus the task may not be able to communicate directly with the data stream routing device 130A that is in communication with the user device 102. The task may thus connect to the pool of load-balanced devices and be assigned to the data stream routing device 130B, and may transmit the token to the data stream routing device 130B to enable that device to establish a communication path to the user device 102 as described below.

At (7), the data stream routing device 130B decodes the token to identify the data stream routing device that has an open connection with the user device 102 (i.e., data stream routing device 130A). Illustratively, the token may contain an IP address or other identifier that corresponds to the data stream routing device 130A, and decoding the token may allow the data stream routing device 130B to determine which of its peers should receive the data stream that the task is transmitting. The token may further contain a request identifier or other information corresponding to the request and/or the connection associated with the request. At (8), the data stream routing device 130B transmits the request identifier and the data stream to the data stream routing device 130A, which at (9) uses the request identifier to determine where the data stream should be routed (i.e., to a particular connection on the user device 102). In some embodiments, the data stream routing device 130B may transmit the token rather than the request identifier, and the data stream routing device 130A may decode the token to obtain the request identifier. In some embodiments, the data stream routing device 130A may transmit an indication to the data stream routing device 130B that it is ready to receive and route the data stream.

At (10), the data stream routing device 130A begins transmitting the streaming output of the task via the determined connection to the user device 102. In various embodiments, the task and the data stream routing device 130B may transmit the token separately from the data stream at (6) and (8) or may include the token in the data stream. In some embodiments, a load balancer may coincidentally assign both the request generated at (1) and the output transmitted at (6) to the same data stream routing device 130A, in which case the data stream routing device 130A performs the interaction at (7), identifies the token as one that it generated, and the interaction at (8) is thus omitted as the serverless computing environment 110 and the user device 102 both communicate with the same data stream routing device 130A.

It will be understood that FIGS. 2A and 2B are provided for purposes of example, and that many variations on the depicted interactions are within the scope of the present disclosure. For example, the interaction at (6) may be partially carried out (i.e., the token may be transmitted) before the task begins generating output data. As a further example, the interactions at (7) and (9) may be combined, such that the data stream routing device 130B processes the token to identify both the data stream routing device 130A and the specific request that is awaiting output, and may pass the latter information to the data stream routing device 130A rather than the data stream routing device 130A separately decoding the token. FIGS. 2A and 2B are thus understood to be illustrative and not limiting.

Figure 3A:
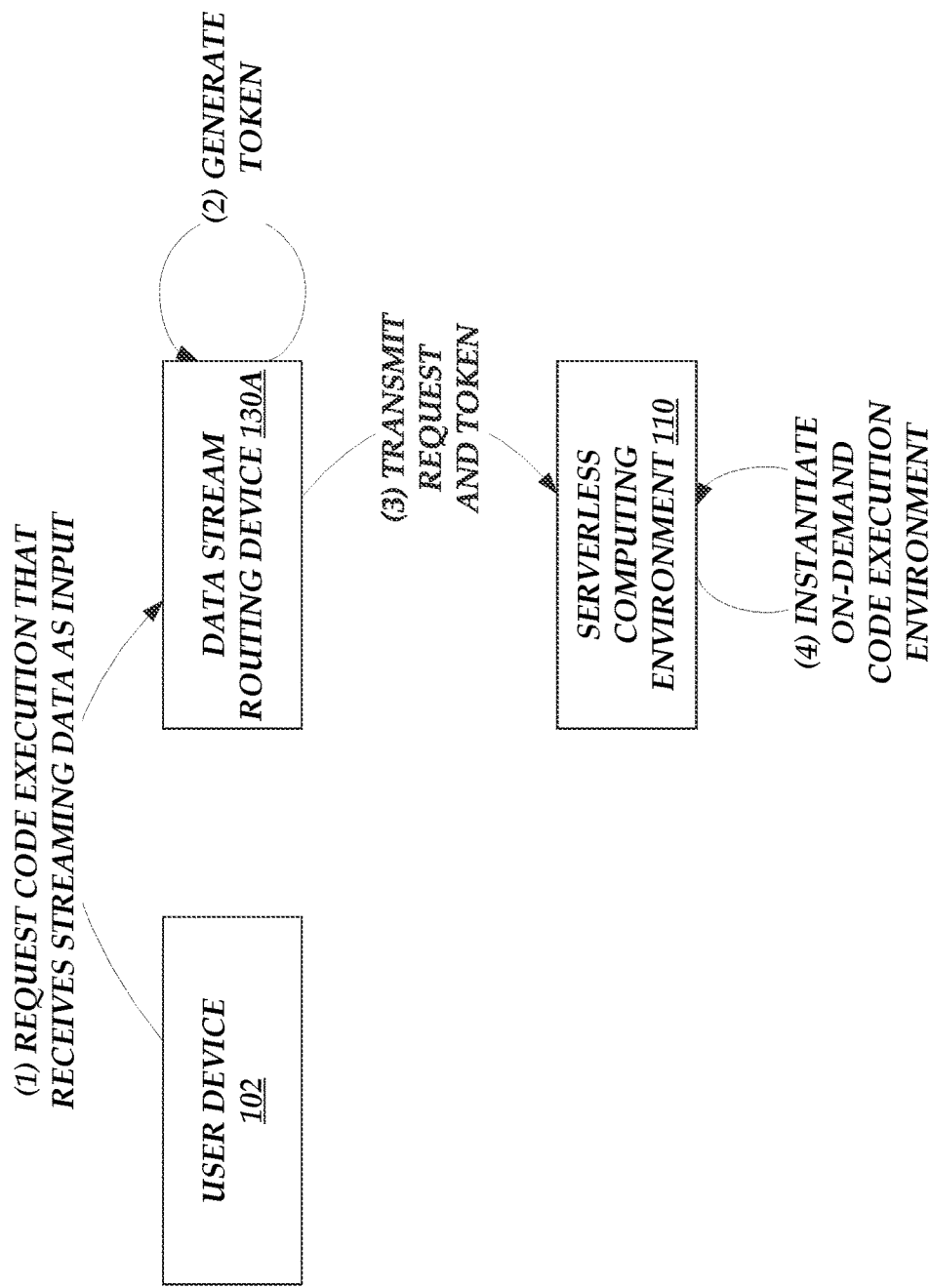
FIGS. 3A, 3B, and 3C are flow diagrams depicting example interactions for transmitting a data stream from a serverless computing environment to a user device via an ephemeral data stream routing service in accordance with aspects of the present disclosure.
Figure 3B:
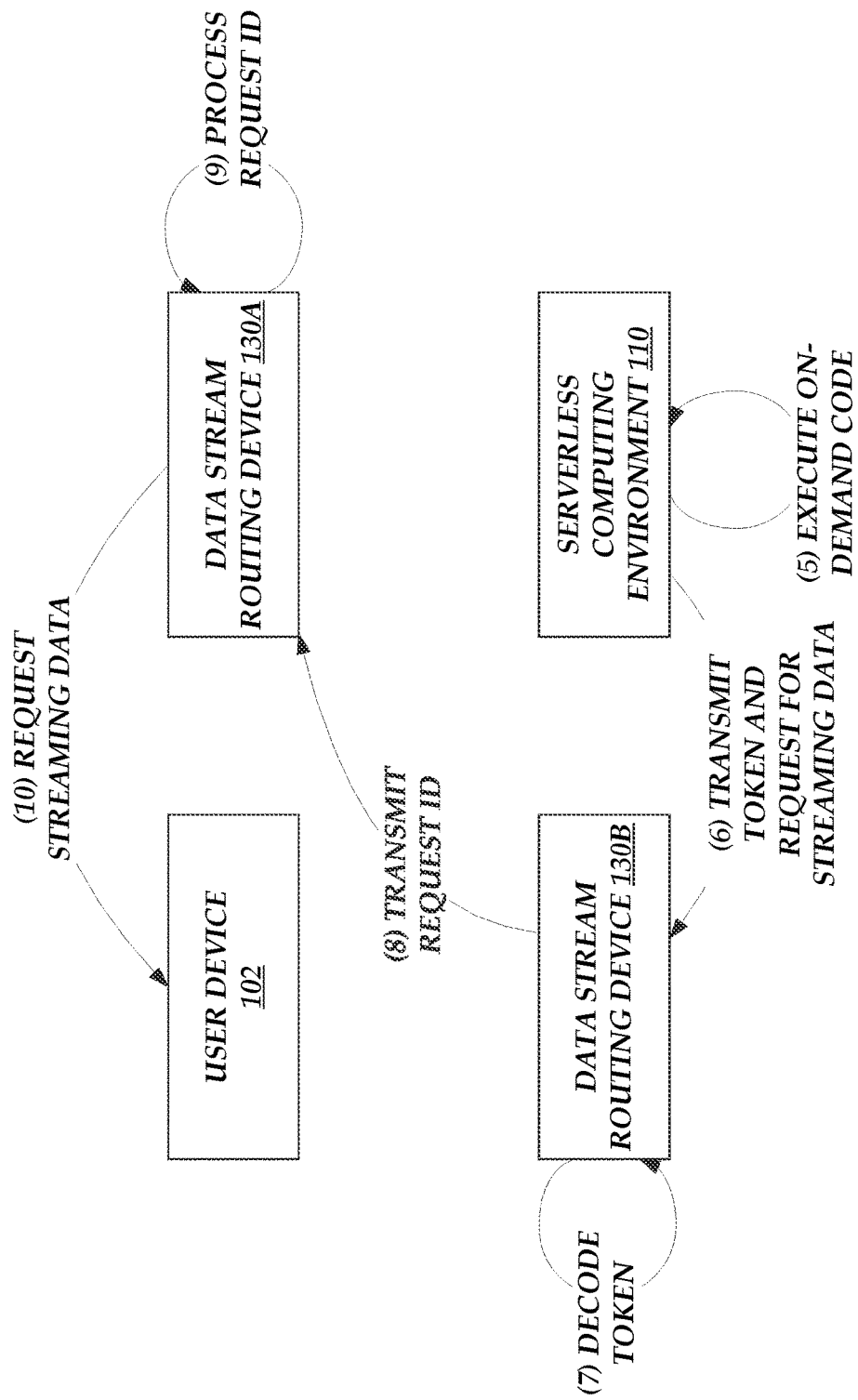
Figure 3C:
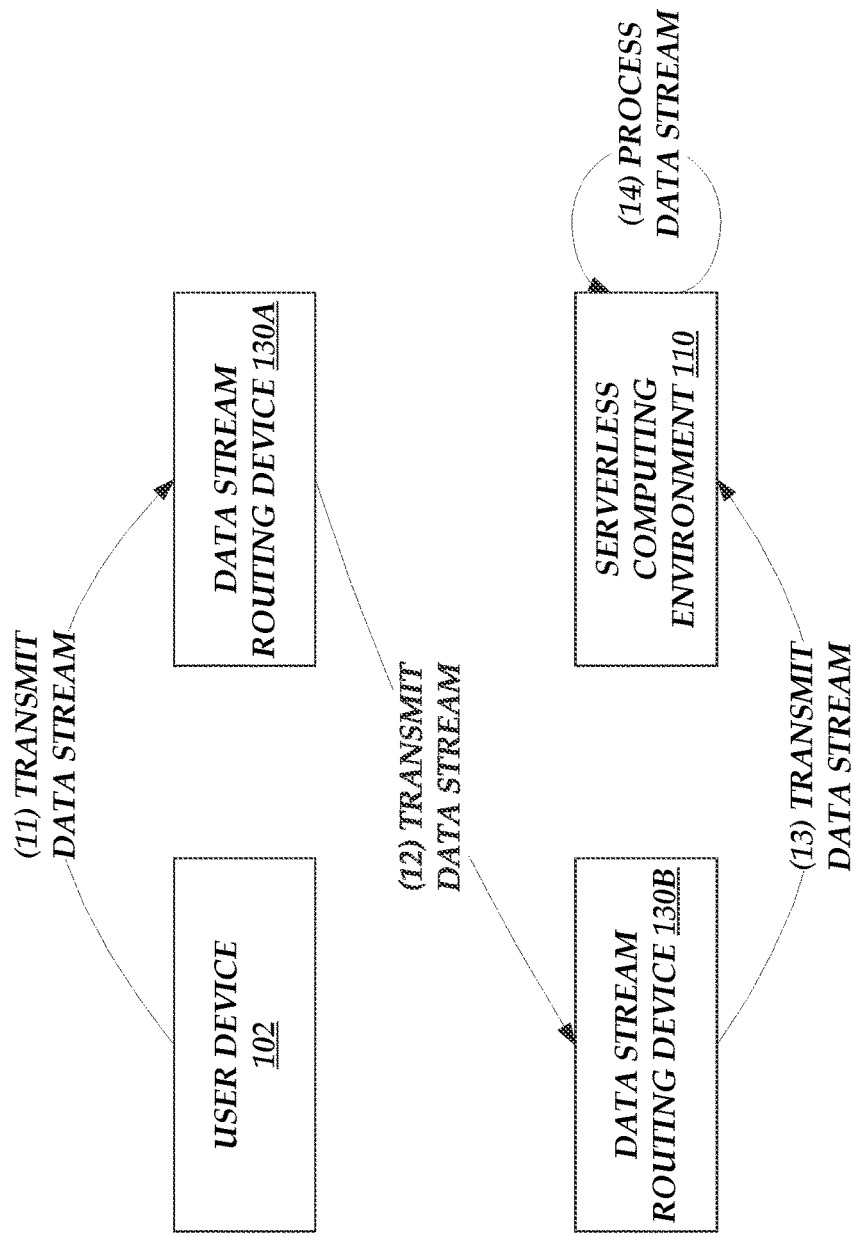

FIGS. 3A, 3B, and 3C depict illustrative interactions for establishing an input data stream (i.e., a data stream from the user device 102 to the task executing in the serverless computing environment 110) via an ephemeral data stream routing service in accordance with aspects of the present disclosure. The interactions depicted in FIGS. 3A, 3B, and 3C are generally similar to those depicted in FIGS. 2A and 2B, but the order in which these interactions occur and the devices that perform these interactions may vary in order to establish a data stream that is "incoming" to the remotely executing task. The interactions in FIGS. 3A, 3B, and 3C are thus described briefly and with reference to where and how they differ from the interactions in FIGS. 2A and 2B.

At (1), the user device 102 establishes a connection to the data stream routing device 130A and sends a data stream routing request. Illustratively, the data stream routing request may be an HTTP PUT request, and may include information that identifies a recipient to which to route the data stream. For example, the request may specify that a remote computing environment (e.g., the serverless computing environment 110) should execute a task that will receive input from the user device 102 in the form of streaming data. At (2), as described above, the data stream routing device 130A generates a token for the request, and at (3) transmits the request and the routing token to the serverless computing environment 110. At (4), the serverless computing environment 110 instantiates executable code corresponding to the requested task in a suitable computing environment.

With reference now to FIG. 3B, at (5), the serverless computing environment 110 begins execution of the task, which at (6) transmits the token and a request for the streaming data to the data stream routing device 130B. At (7), the data stream routing device 130B decodes the token to obtain a request identifier and identify the data stream routing device 130A that received the request via the connection established at (1). At (8) the data stream routing device 130B transmits the request identifier to the identified data stream routing device 130A, which at (9) uses the request identifier to associate the incoming data stream from the user device 102 with the data stream routing device 130B. At (10), the data stream routing device 130A transmits information to the user device 102 indicating that it is ready to receive a data stream from the user device 102. Illustratively, the information transmitted at (10) may include flow control information that instructs the user device 102 to begin streaming data over the connection established at (1).

With reference now to FIG. 3C, at (11), the user device 102 begins transmitting the data stream to the data stream routing device 130A via the established connection. Illustratively, the data stream may be generated from a data store on the user device 102 (e.g., the user device 102 may stream the contents of a data file), generated algorithmically, obtained from another source, or otherwise obtained or generated. At (12), the data stream routing device 130A begins transmitting the data stream received from the user device to the device that was associated with the data stream by the token (i.e., the data stream routing device 130B). At (13), the data stream routing device 130B then in turn transmits the data stream to the task executing in the serverless computing environment 110, which at (14) processes its input.

It will be understood that FIGS. 3A, 3B, and 3C are provided for purposes of example, and that many variations on the depicted interactions are within the scope of the present disclosure. For example, the interaction at (6) may be carried out prior to or in parallel with the interaction at (5), such that the serverless computing environment 110 reduces latency by transmitting the token on behalf of the task. As a further example, the interaction at (10) may be omitted and the interactions at (1) and (11) carried out in parallel, such that the user device 102 transmits the request to execute the task in conjunction with transmitting the data stream that the task will consume. FIGS. 3A, 3B, and 3C are thus understood to be illustrative and not limiting.

Figure 4A:
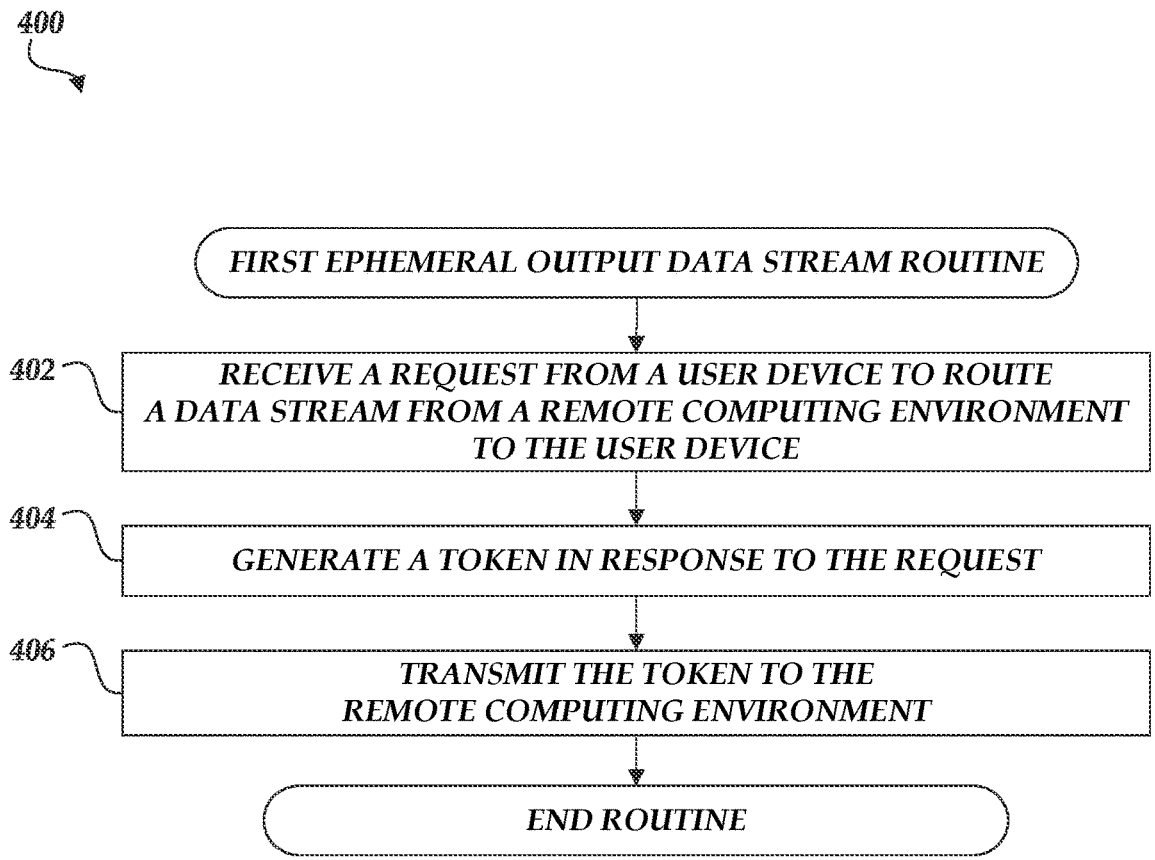
FIGS. 4A, 4B, and 4C are flowcharts depicting example routines for routing an input data stream from a user device to a serverless computing environment in accordance with aspects of the present disclosure.

FIG. 4A is a flowchart depicting a first example routine 400 for routing an output data stream from a task executing in a remote computing environment (e.g., the serverless computing environment 110 depicted in FIG. 1) to a user device (e.g., the user device 102 depicted in FIG. 1). The first example routine 400 may be carried out, for example, by the data stream routing device 130A as depicted in FIGS. 2A and 2B. The routine 400 begins at block 402, where a user device may establish a connection and request that a data stream be routed to the user device. In some embodiments, the request received at block 402 may include, for example, a request that a remote computing environment execute a process or task that outputs a data stream. In other embodiments, the remote computing environment or service from which to route a data stream may be inferred from the request.

At block 404, a token may be generated that corresponds to the request and/or corresponds to the connection via which the request was received. In some embodiments, as described above, the token may include information that uniquely identifies the request and/or connection, such as a timestamp of when the connection was made and information identifying the user device. In other embodiments, the request token may be generated randomly, obtained from an external source (e.g., a request counter), or generated using other techniques that generate a unique token. In some embodiments, a second token may be generated that corresponds to a pool of data stream routing devices, and may be used to ensure that the data stream is delivered to the pool of data stream routing devices that includes the device executing the routine 400.

At block 406, the token and other information may be transmitted to a remote computing environment, which, as described below, causes the remote computing environment to generate a data stream. In some embodiments, as described above, the request transmitted at block 406 may be identical to the request received from the user device at block 402. In other embodiments, a request may be generated in a format understood by the remote computing environment, and that request may be transmitted along with the token at block 406. In some embodiments, the token may be included in the request. For example, the token may be included in the request as header information or other metadata.

Transmitting the token and other information to the remote computing environment will generally cause a second data stream routing device (e.g., the data stream routing device 130B depicted in FIGS. 2A-2B) to receive and process the token, which may be done by carrying out a routine such as the routine 420 described below with reference to FIG. 4B. In various embodiments, the token may be received directly from the remote computing environment to which the token is sent at block 406, or may be received from another computing environment (e.g., because the remote computing environment that initially received the token passes it to one or more other computing environments as the data stream is generated and processed). The original data stream routing device that executes the routine 400 may then execute a third routine, such as the routine 460 described below with reference to FIG. 4C, in response to receiving the token from the second data stream routing device.

Figure 4B:
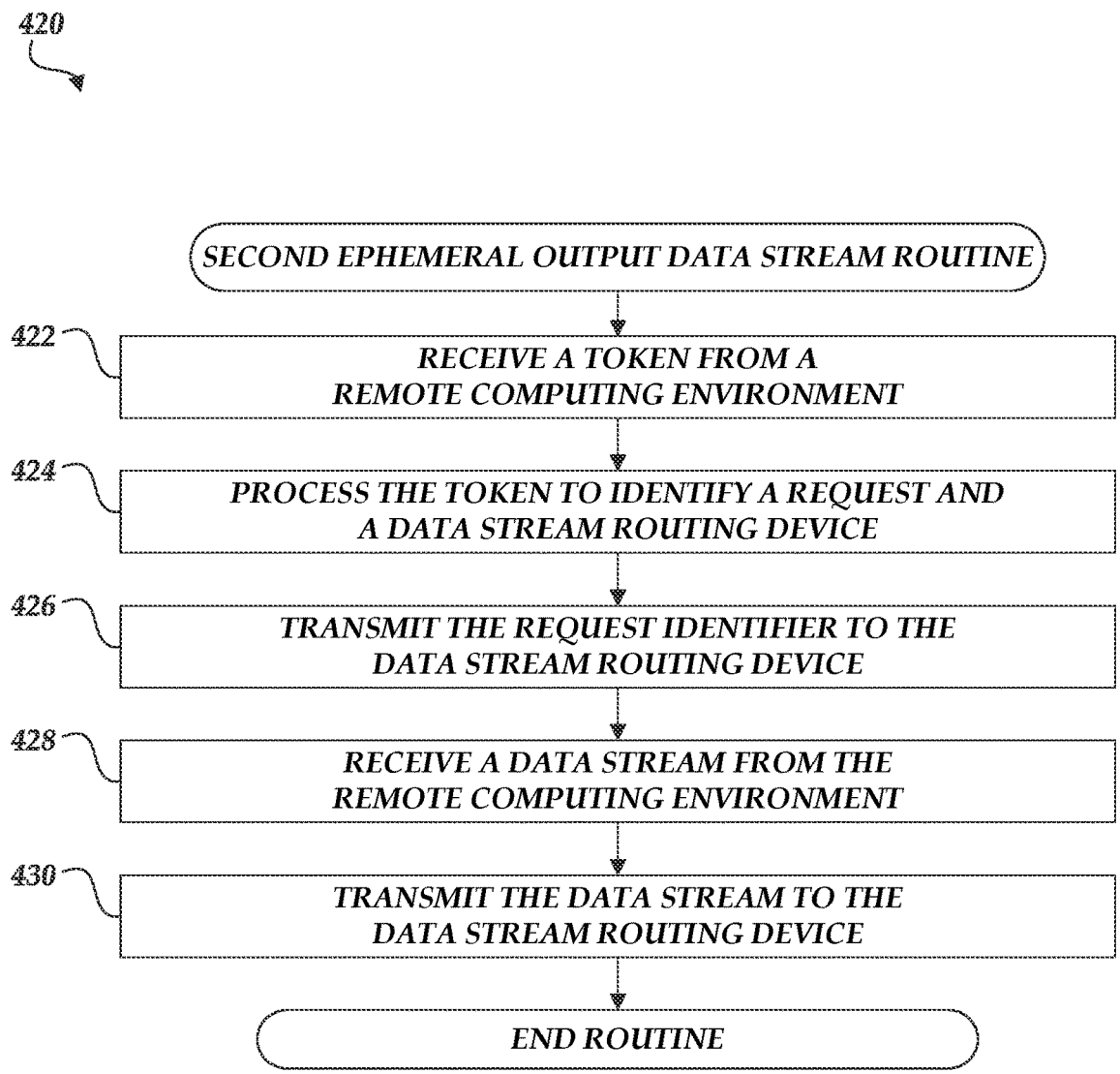

With reference now to FIG. 4B, a second example routine 420 for routing an output data stream from a task executing in a remote computing environment to a user device will be described. The second example routine 420 may be carried out, for example, by the data stream routing device 130B as depicted in FIGS. 2A and 2B. The routine 450 begins at block 422, where a token may be received from a remote computing environment. Illustratively, the token may be the token generated at block 404 of the routine 400 depicted in FIG. 4A.

At block 424, the token may be processed to identify the data stream routing device that generated the token and obtain a request identifier for the routing request associated with the token. Thereafter, at block 426, the request identifier may be transmitted to the identified data stream routing device. By transmitting the request identifier to the identified data stream routing device, the routine 420 establishes a routing path from the task executing in the remote computing environment to the data stream routing device that is in communication with the user device from which the request originated. The latter data stream routing device may then process the request identifier to identify the request and complete the routing path, as described below with reference to FIG. 4C.

At block 426, all or part of a data stream may be received from the remote computing environment. In some embodiments, the routine 420 may transmit an indication that it is ready to receive the data stream (e.g., after receiving confirmation from the other data stream routing device that both it and the user device are ready to receive) before receiving the data stream at block 452. In other embodiments, blocks 422 and 428 may be combined, and a data stream may be received that contains the token. At block 430, the data stream may be transmitted to the data stream routing device identified at block 424. Illustratively, blocks 428 and 430 may be carried out iteratively and may transmit portions of the data stream as they are received.

It will be understood that FIG. 4B is provided for purposes of example, and that many variations on the depicted routine 450 are within the scope of the present disclosure. For example, block 428 may be carried out at any time prior to block 430 and may be carried out in parallel with any or all of blocks 422, 424, and 426. FIG. 4B is thus understood to be illustrative and not limiting.

Figure 4C:
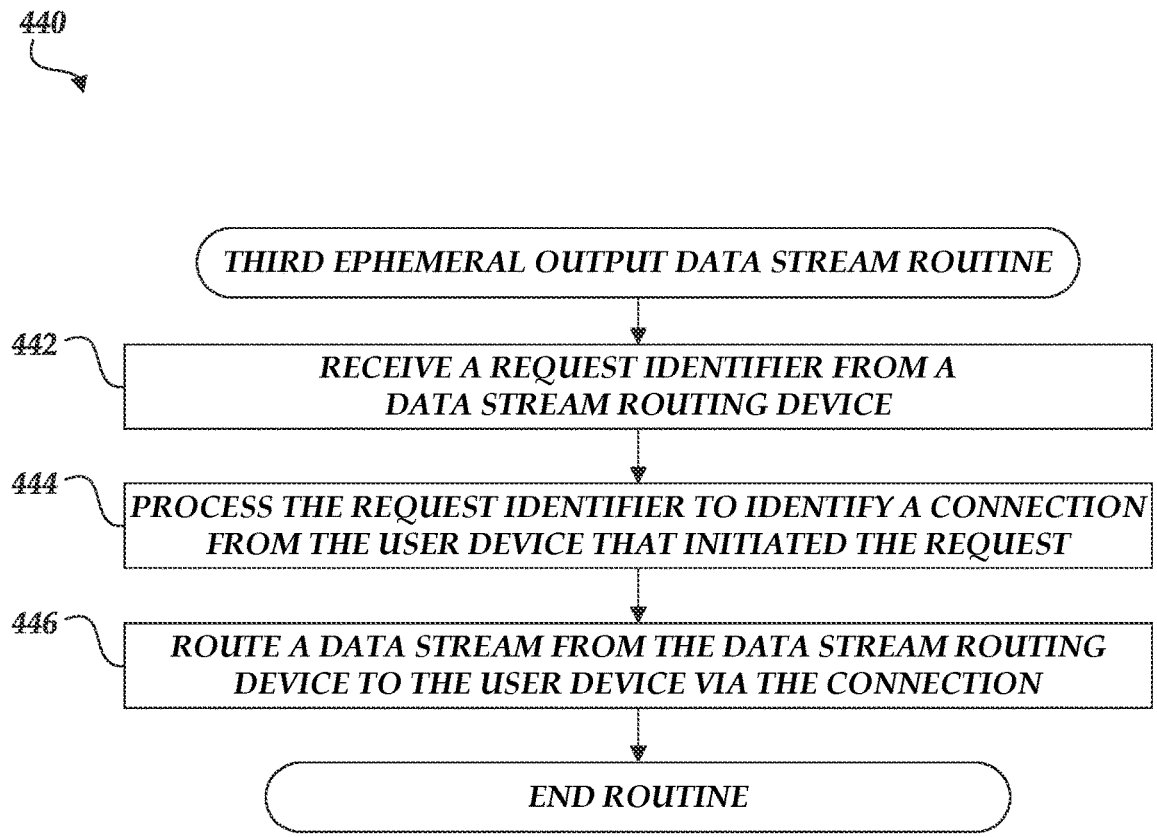

FIG. 4C is a flowchart depicting a third example routine 440 for routing an output data stream from a second data stream routing device (e.g., the data stream routing device 130B depicted in FIG. 1) to the device from which the request for an output data stream originated (e.g., the user device 102 depicted in FIG. 1). The third example routine 440 may be carried out, for example, by the data stream routing device 130A that initially processed the request and generated the token, as depicted in FIGS. 2A and 2B. The routine 440 begins at block 442, where a request identifier may be received from the second data stream routing device. At block 444 the request identifier may be processed to identify a connection from the user device that initiated the request. Illustratively, the user device that initially connected to the data stream routing device 130A and initiated the request may be awaiting a response via the connection that was used to transmit the request. For example, the user device may initiate the request by issuing an HTTP GET request or invoking an API call, and may be awaiting a response that includes the streaming output data. At block 446, a data stream may be received from the second data stream routing device and routed to the user device from which the request was received via the identified connection.

Figure 5A:
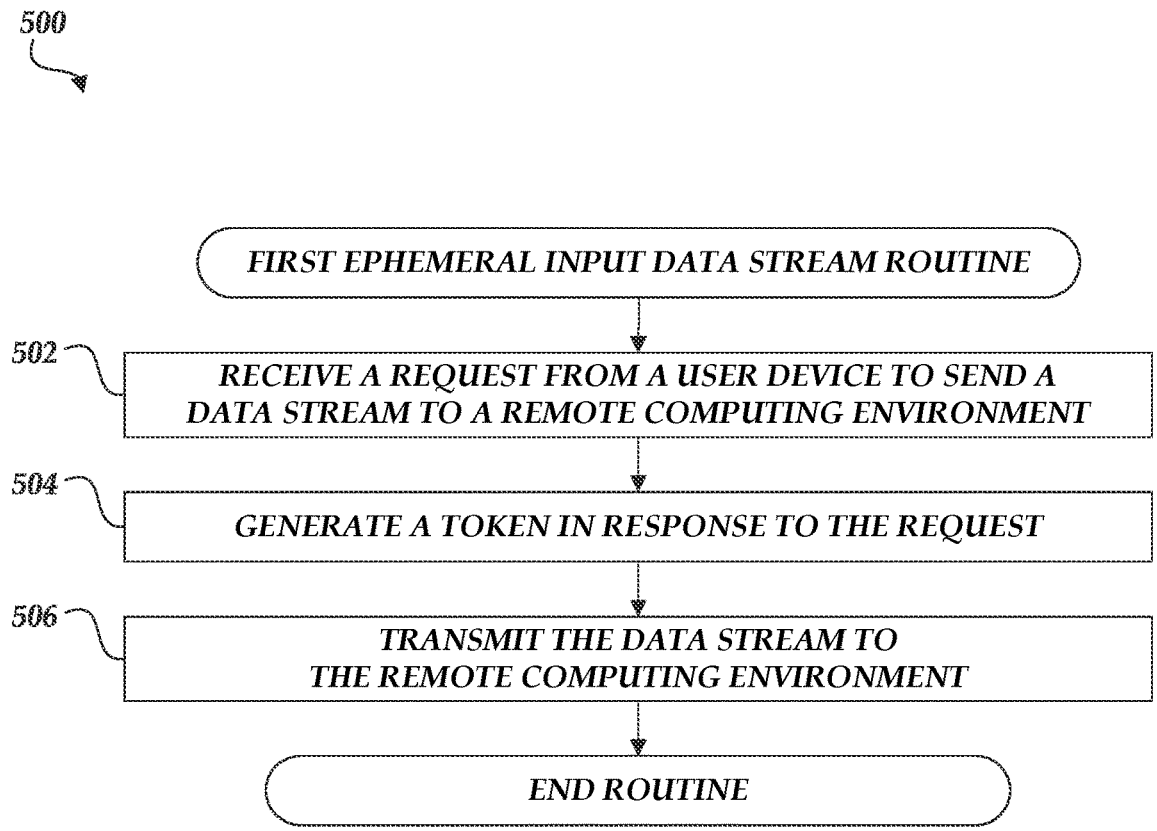
FIGS. 5A, 5B, and 5C are flowcharts depicting example routines for routing an output data stream from a serverless computing environment to a user device in accordance with aspects of the present disclosure.

FIG. 5A is a flowchart depicting a first example routine 500 for routing an input data stream from a user device (e.g., the user device 102 depicted in FIG. 1) to a remote computing environment (e.g., the serverless computing environment 110 depicted in FIG. 1). The first example routine 500 may be carried out, for example, by the data stream routing device 130A as depicted in FIGS. 3A, 3B, and 3C. It will be understood that many of the blocks of the routine 500 are similar to the blocks of the routine 400 depicted in FIG. 4A, but the order in which blocks are carried out (and the devices from which data streams are received and transmitted) may vary in order to establish a data stream in the other direction. The blocks of the routine 500 are thus described briefly, and with reference to where and how they differ from the blocks of the routine 400.

The routine 500 begins at block 502, where a request may be received from a user device to transmit a data stream to a remote computing environment. At block 504 a token may be generated that uniquely identifies the request, the connection made by the user device, and/or the device executing the routine 500. At block 506, the token and, in some embodiments, other information identifying the task or process to receive the data stream, may be transmitted to a remote computing environment. As described above, transmitting the token to a remote computing environment may cause a second data stream routing device to receive the token. The second data stream routing device may then execute a routine (e.g., the routine 540 described with reference to FIG. 5B below) to process the token and establish part of the route from the user device to the remote computing environment. The second data stream routing device may then transmit the token back to the original data stream routine device, which may process it and complete the route from the user device to the remote computing environment by executing a third routine (e.g., the routine 560 described with reference to FIG. 5C below).

Figure 5B:
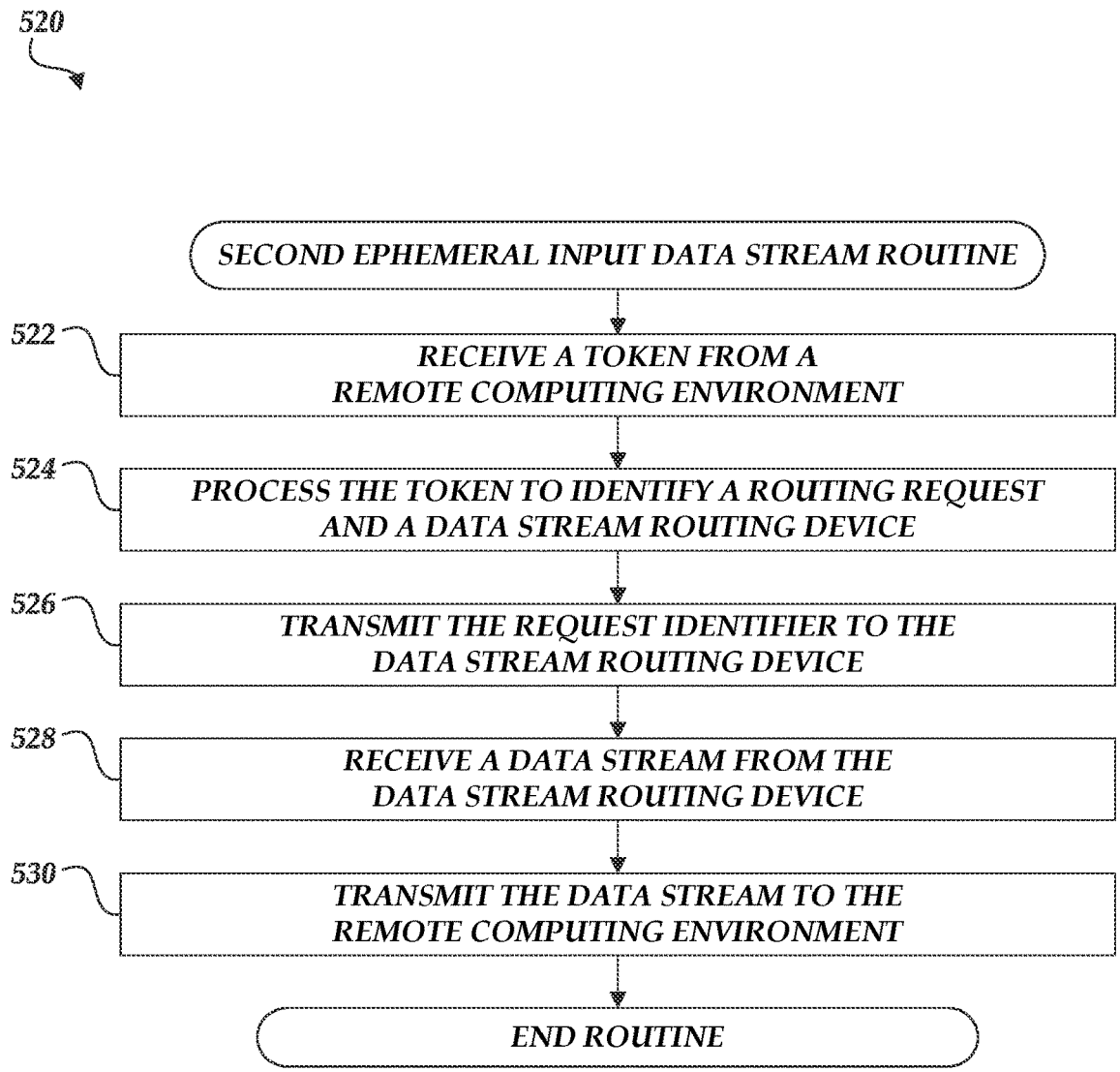

With reference now to FIG. 5B, a second example routine 520 for routing an input data stream from a user device to a remote computing environment will be described. The second example routine 520 may be carried out, for example, by the data stream routing device 130B as depicted in FIGS. 3A, 3B, and 3C. It will be understood that many of the blocks of the routine 520 are similar to the blocks of the routine 520 depicted in FIG. 4B, but the order in which blocks are carried out (and the devices from which data streams are received and transmitted) may vary in order to establish a data stream in the other direction. The blocks of the routine 520 are thus described briefly, and with reference to where and how they differ from the blocks of the routine 420.

The routine 520 begins at block 522, where a request identifier may be received from a remote computing environment. At block 524 the request identifier may be processed to identify the data stream routing device that generated the token, and at block 526 the request identifier (or, in some embodiments, the token) may be transmitted to this device. At block 528, a data stream may be received from the data stream routing device identified at block 524. Illustratively, the data stream routing device identified at block 524 may be carrying out a routine, such as the routine 540 described below with reference to FIG. 5C, that causes it to receive a data stream from a user device via an established connection and then transmit that data stream to the device that sends it the token (i.e., the device executing the routine 520). At block 530, the data stream received at block 528 may be transmitted to the remote computing environment from which the token was received. The data stream may thus be routed from the requesting user device to the remote computing environment, even though the user device and the task are not capable of communicating directly with each other (or are not permitted to communicate directly with each other).

Figure 5C:
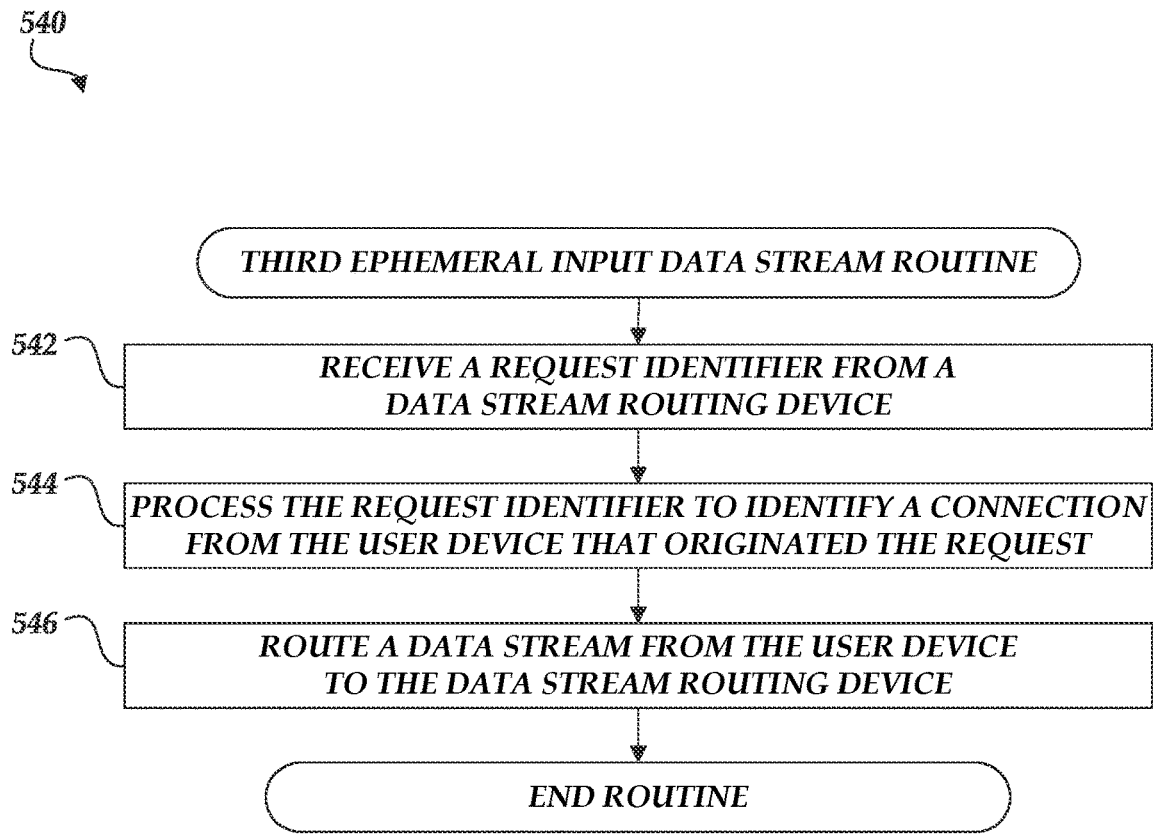

FIG. 5C is a flowchart depicting a third example routine 540 for routing an input data stream from a user device (e.g., the user device 102 depicted in FIG. 1) to a second data stream routing device (e.g., the data stream routing device 130B depicted in FIGS. 3A, 3B, and 3C). The third example routine 540 may be carried out, for example, by the data stream routing device 130A as depicted in FIGS. 3A, 3B, and 3C. It will be understood that many of the blocks of the routine 540 are similar to the blocks of the routine 440 depicted in FIG. 4C, but the order in which blocks are carried out (and the devices from which data streams are received and transmitted) may vary in order to establish a data stream in the other direction. The blocks of the routine 540 are thus described briefly, and with reference to where and how they differ from the blocks of the routine 440.

The routine 540 begins at block 542, where a request identifier may be received from the second data stream routing device. At block 544, the request identifier may be processed to identify a request and/or an associated connection that is ready to send (or, in some embodiments, is sending) a data stream that is intended as input data to a task executing in a remote computing environment. At block 546, a data stream may be received from the user device via the identified connection, and may be routed to the data stream routing device that sent the token at block 542. The routine 540 may thus partially complete the routing path from the user device that initiated the request and provides the input data stream to the task that processes the data stream.

Figure 6:
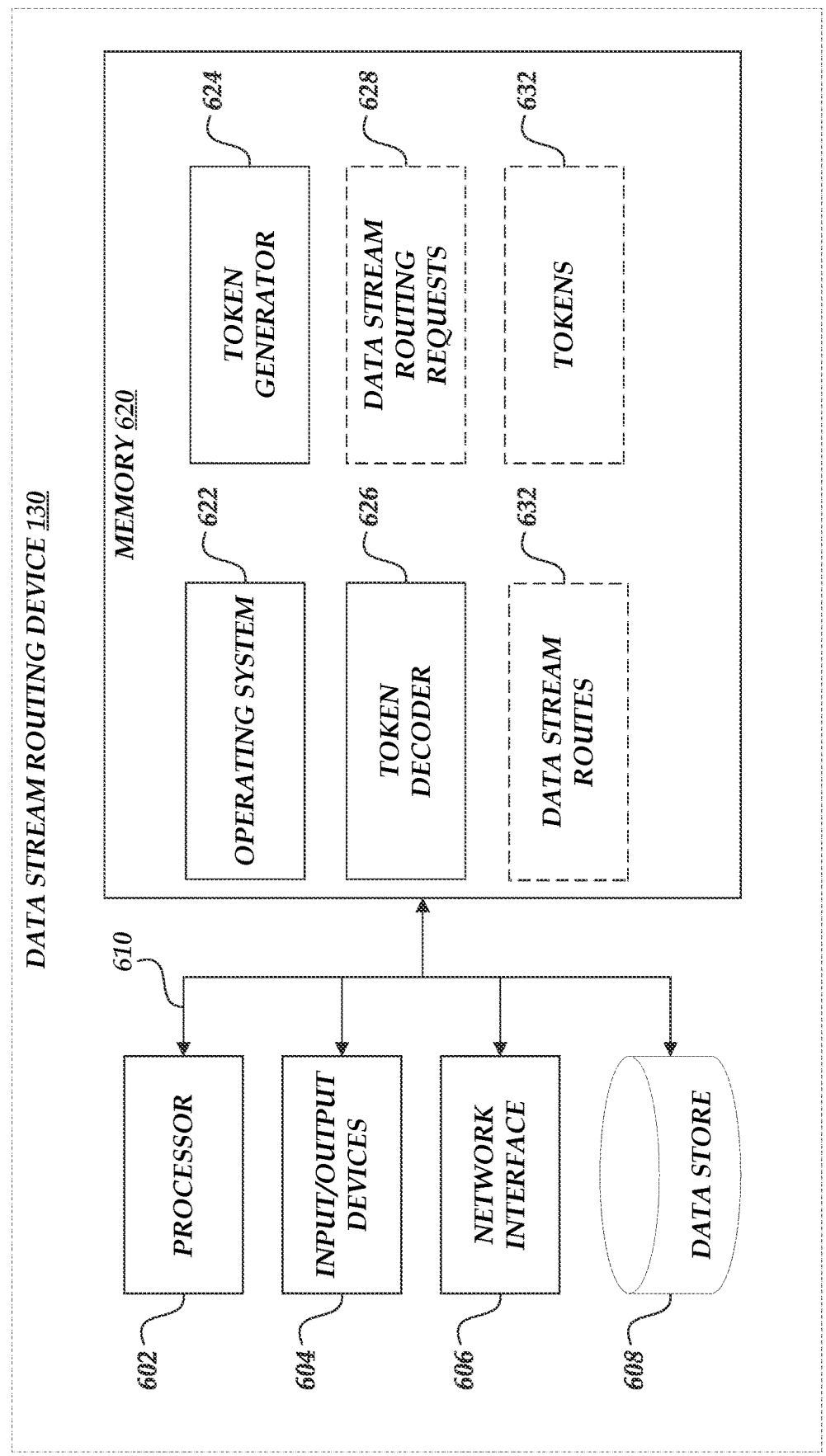
FIG. 6 depicts a general architecture of a computing device that is used by an ephemeral data stream routing service to route data streams in accordance with aspects of the present disclosure.

FIG. 6 depicts a general architecture of a computing system, referenced as a data stream routing device 130, that operates to route data streams between external devices (e.g., the user device 102 depicted in FIG. 1), other data stream routing devices, and computing environments that limit access to underlying computing resources (e.g., the serverless computing environment 110 of FIG. 1) in accordance with aspects of the present disclosure. The general architecture of the data stream routing device 130 depicted in FIG. 6 includes an arrangement of computer hardware and software modules that may be used to implement aspects of the present disclosure. The hardware modules may be implemented with physical electronic devices, as discussed in greater detail below. The data stream routing device 130 may include many more (or fewer) elements than those shown in FIG. 6. It is not necessary, however, that all of these generally conventional elements be shown in order to provide an enabling disclosure. Additionally, the general architecture illustrated in FIG. 6 may be used to implement one or more of the other components illustrated in FIG. 1.

The data stream routing device 130 includes a processor 602, input/output device interfaces 604, a network interface 606, and a data store 608, all of which may communicate with one another by way of a communication bus 610. The network interface 606 may provide connectivity to one or more networks or computing systems. The processor 602 may thus receive information and instructions from other computing systems or services via, e.g., the network 104 depicted in FIG. 1. The processor 602 may also communicate to and from a memory 620 and further provide output information for an optional display (not shown) via the input/output device interfaces 604. The input/output device interfaces 604 may also accept input from an optional input device (not shown). The data store 608 may generally be any non-transitory computer-readable data store, including but not limited to hard drives, solid state devices, magnetic media, flash memory, and the like. In some embodiments, the data store 608 may be implemented as a database, web service, or cloud computing service, and may be external to the data stream routing device 130. Additionally, in various embodiments, the data store 608 may be implemented as a single data store or distributed across multiple data stores.

The memory 620 may contain computer program instructions (grouped as modules in some embodiments) that the processor 602 executes in order to implement one or more aspects of the present disclosure. The memory 620 generally includes random access memory (RAM), read only memory (ROM) and/or other persistent, auxiliary or non-transitory computer readable media. The memory 620 may store an operating system 622 that provides computer program instructions for use by the processor 602 in the general administration and operation of the data stream routing device 130. The memory 620 may further include computer program instructions and other information for implementing aspects of the present disclosure. In addition, the memory 620 may include and/or communicate with one or more data repositories (not shown), for example, to access user program codes and/or libraries.

In the illustrated embodiment, the memory 620 includes a token generator 624, which (as described in more detail above) may generate tokens 632 based on data stream routing requests 628 that have been loaded into the memory 620. The tokens may generally contain information that uniquely identifies the data stream routing request 632 for which the token was generated, including, as discussed above, information that identifies a particular connection to the device that sent the request. The memory 620 further includes a token decoder 628, which may decode a received token to recover the information (e.g., a unique request identifier) that was encoded into the token by the token generator 624.

The memory 620 further includes data stream routing requests 628, which may include information that identifies the computing device that originated the request (e.g., the user device 102 depicted in FIG. 1) and the computing devices or computing environments between which the data stream is to be routed. The memory 620 may further contain data stream routes 632 that have been determined as a result of, e.g., carrying out various combinations of the routines 400, 420, 440, 500, 520, and 540 described above, and may still further contain tokens 632 that have been generated or received by the data stream routing device 130.

In some embodiments, the data stream routing device 130 may include further components other than those illustrated in FIG. 6. For example, the memory 620 may include data that is "in transit" and being routed via one of the data streams, information that will be encoded into tokens 632 by the token generator 624, or information that has been decoded from received tokens 632 by the token decoder 626. FIG. 6 is thus understood to be illustrative but not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for processing input data of arbitrary size in a serverless computing environment, the system comprising:
a first data stream routing device of a plurality of data stream routing devices, the first data stream routing device comprising a first processor in communication with a first data store, wherein the first processor executes computer-executable instructions stored in the first data store to perform operations including:
receiving a data stream routing request via a first connection made by a user device, wherein the data stream routing request is associated with a request to execute a task in a serverless computing environment;
generating a token based at least in part on the data stream routing request, wherein the token includes information that identifies the data stream routing request and the first data stream routing device;
transmitting the request to execute the task and the token to the serverless computing environment; and
a second data stream routing device, the second data stream routing device comprising a second processor in communication with a second data store, wherein the second processor executes computer-executable instructions stored in the second data store to perform operations including:
receiving, via a second connection made by the task executing in the serverless computing environment, the token;
processing the token to obtain the information identifying the data stream routing request and the first data stream routing device;
transmitting the information identifying the data stream routing request to the first data stream routing device, wherein transmitting the information identifying the data stream routing request to the first data stream routing device causes the first data stream routing device to route streaming input data from the user device to the second data stream routing device via the first connection; and
transmitting the streaming input data to the task executing in serverless computing environment via the second connection.

2. The system of claim 1, wherein the serverless computing environment imposes a size limit on requests.

3. The system of claim 2, wherein a size of the streaming input data exceeds the size limit.

4. The system of claim 1, wherein the request includes a payload comprising one or more parameters passed to the serverless computing environment.

5. The system of claim 1, wherein the task executing in the serverless computing environment begins processing the streaming input data while it is being received.

6. A computer-implemented method comprising:
receiving, by a first data stream routing device, a request via a first connection from a user device to route streaming input data from the user device to a remote computing environment;
generating a token in response to the request;
transmitting the token to the remote computing environment;
receiving, by a second data stream routing device, the token via a second connection from the remote computing environment;
processing, by the second data stream routing device, the token to identify the first data stream routing device and obtain a request identifier corresponding to the request;
transmitting, by the second data stream routing device, the request identifier to the first data stream routing device, wherein transmitting the request identifier to the first data stream routing device causes the first data stream routing device to route streaming input data from the user device to the second data stream routing device via the first connection; and
routing, by the second data stream routing device, the streaming input data received from the first data stream routing device to the remote computing environment via the second connection.

7. The computer-implemented method of claim 6, wherein the first data stream routing device and the second data stream routing device are selected from a plurality of data stream routing devices by a load balancer.

8. The computer-implemented method of claim 6, wherein the remote computing environment comprises a serverless computing environment.

9. The computer-implemented method of claim 6, wherein the request indicates that the user device will provide the streaming input data.

10. The computer-implemented method of claim 6 further comprising:
subsequent to the second data stream routing device transmitting the request identifier to the first data stream routing device, receiving, by a third data stream routing device via a third connection, the token;
processing, by the third data stream routing device, the token to identify the first data stream routing device and obtain the request identifier;
transmitting, by the third data stream routing device, the request identifier to the first data stream routing device; and receiving, by the third data stream routing device, an indication that the token is no longer valid.

11. The computer-implemented method of claim 6, wherein the request identifies the remote computing environment.

12. The computer-implemented method of claim 6 further comprising generating, by the first data stream routing device, a second token that identifies a plurality of data stream routing devices, wherein the plurality of data stream routing devices includes the first data stream routing device and the second data stream routing device.

13. The computer-implemented method of claim 12, wherein the remote computing environment processes the second token to identify the plurality of data stream routing devices that includes the first data stream routing device and the second data stream routing device.

14. The computer-implemented method of claim 6, wherein generating the token comprises encoding information that identifies both the first connection and the first data stream routing device.

15. The computer-implemented method of claim 6, wherein generating the token comprises encoding information that identifies the first connection, and wherein processing the token to identify the first data stream routing device comprises determining that the first connection is associated with the first data stream routing device.

16. The computer-implemented method of claim 6, wherein the first data stream routing device stores an association between the request and the second data stream routing device in response to receiving the request identifier from the second data stream routing device.

17. A system comprising:
a data store storing computer-executable instructions; and
one or more processors configured to execute the computer-executable instructions to implement a data stream routing service, wherein implementing the data stream routing service causes the one or more processors to perform operations including:
receiving, via a first connection between the data stream routing service and a first computing device, a request to conduct a data transfer operation associated with a network location;
generating a first request identifier identifying the request;
transmitting the first request identifier to a second computing device associated with the network location;
receiving a second request identifier via a second network connection initiated by the second computing device, the second network connection being between the data stream routing service and the second computing device;
authenticating the second computing device as associated with the data transfer operation by verifying that the second request identifier matches the first request identifier; and
in response to authenticating the second computing device as associated with the data transfer operation, logically connecting the first and second network connections such that data transmitted by the user device via the first connection is transmitted to the second computing device via the second connection and such that data transmitted by the second computing device via the second connection is transmitted to the first computing device via the first connection.

18. The system of claim 17, wherein the processor executes further computer-executable instructions stored in the data store to perform further operations including processing the second request identifier to identify the request.

19. The system of claim 17, wherein generating the first request identifier comprises generating a unique identifier for the request.

20. The system of claim 17, wherein the second computing device begins processing the data before the first computing device finishes transmitting the data.

* * * * *

UNITED STATES PATENT AND TRADEMARK OFFICE
CERTIFICATE OF CORRECTION

| | |
|---|---|
| PATENT NO. | : 11,343,195 B1 |
| APPLICATION NO. | : 17/118215 |
| DATED | : May 24, 2022 |
| INVENTOR(S) | : Georgi Petev Kolev |

It is certified that error appears in the above-identified patent and that said Letters Patent is hereby corrected as shown below:

On the Title Page

Column 1, Line 1, item (73) under Assignee, delete ".Amazon" and insert --Amazon--.

Signed and Sealed this
Fifteenth Day of November, 2022

Katherine Kelly Vidal
*Director of the United States Patent and Trademark Office*